United States Patent Office 3,262,961
Patented July 26, 1966

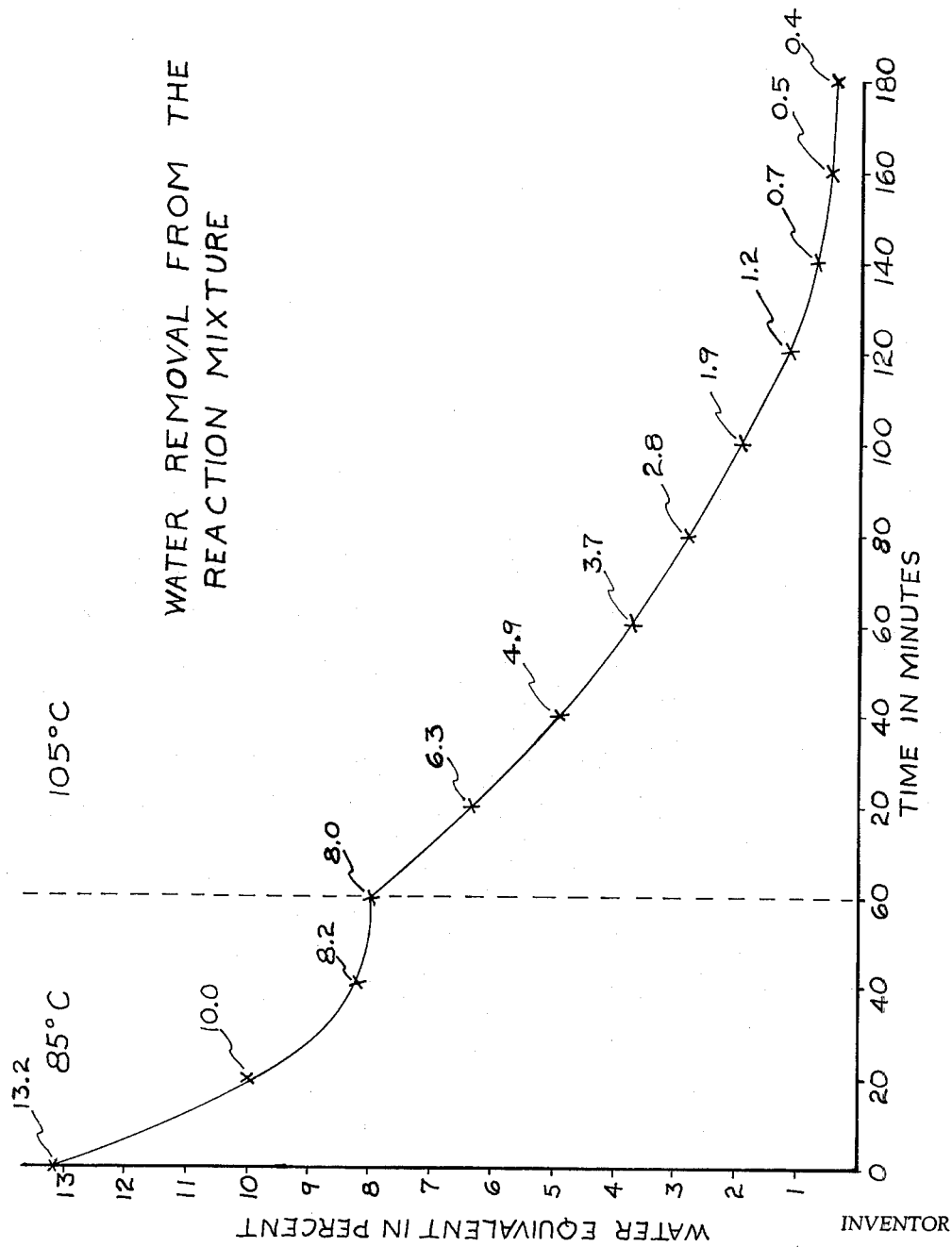

3,262,961
PROCESS FOR SOLUBLE SODIUM
TETRABORATE INHIBITORS
Charles B. Jordan, Aberdeen, Md., assignor to the United
States of America as represented by the Secretary of
the Army
Filed Nov. 8, 1963, Ser. No. 322,557
4 Claims. (Cl. 260—462)

The invention described herein may be manufactured and used by or for the Government for governmental purposes, without the payment to me of any royalty thereon.

This invention relates to an improvement in the process of manufacturing condensates of sodium tetraborate and diols.

More specifically this invention relates to the preparation of fluid condensation products of sodium tetraborate with 1,2-propylene glycol and 2-butyne-1,4-diol which are useful as corrosion inhibiting additives for coolants and hydraulic brake fluids. The improvement comprises a method for measuring the degree of condensation of the reactants and thereby following the course of the reactions and determining suitable termination points through experimentally obtained data.

The above condensates and methods for their preparation were previously disclosed in U.S. Patent 3,087,959 which was issued to me on April 30, 1963, and in the copending application of Jordan and Pray, Serial No. 174,652, filed February 20, 1963, now abandoned. Because of the complex nature of these condensates, no exact proof of their chemical structure was possible. Preferred compositions were recognized only after prolonged tests of their effectiveness and could only be described in terms of their method of preparation.

The essential features of preparation given in the above-cited disclosures are as follows: A quantity constituting one part by weight of 1,2-propylene glycol is introduced into an open beaker and heated until a temperature of 85°±5° C. is attained. This temperature is maintained while a quantity of .01 to .37 and preferably .30 part by weight, based on the weight of the 1,2-propylene glycol, of sodium tetraborate decahydrate is added. The sodium tetraborate decahydrate is added slowly and at such a rate as to avoid an accumulation of the solid; or alternatively it may be added in increments, no increment being larger than .10 part by weight of the glycol, and with stirring until the prior increment is completely dissolved before a further addition. Upon the addition of the last increment, the temperature is raised to 105°±5° C. and the solution is maintained at this temperature for three hours.

In substituting less completely hydrated forms of sodium tetraborate, enough water is added to the glycol to insure the solubilization of the sodium tetraborate. In such cases, the weight of the sodium tetraborate added will be correspondingly less than when the decahydrate is used.

In preparing the double condensate of sodium tetraborate with 1,2-propylene glycol and 2-butyne-1,4-diol the above procedure is changed in that after the addition of the final increment of the sodium tetraborate the solution is heated only one hour at 105° C. and then .01 to .25, preferably .15, part by weight of 2-butyne-1,4-diol are added slowly and with stirring and the solution maintained at a temperature of 105°±5° C. for an additional two hours and with continued stirring.

Based on current theories, the condensation reaction between sodium tetraborate and diols proceeds as follows:

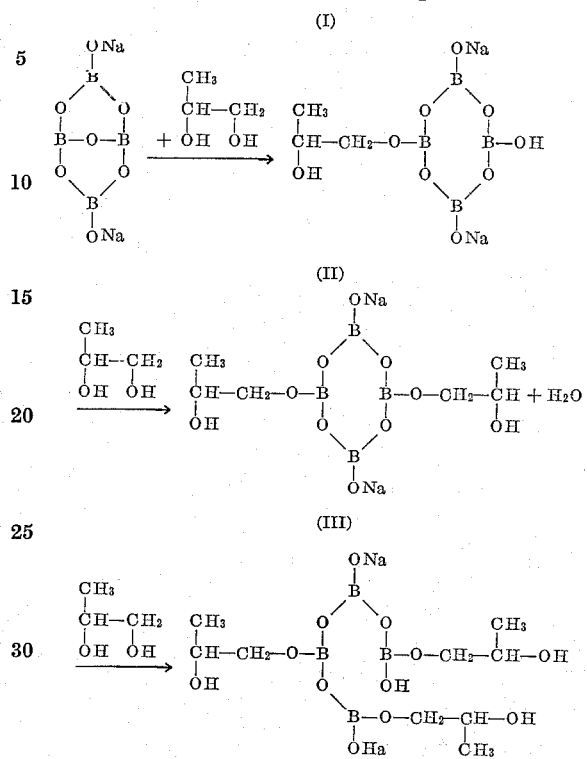

Alternatively, 2-butyne-1,4-diol may be used in place of 1,2-propylene glycol after Stage I or II. In either case, however, objectionable solids will form if the condensation is carried beyond the stage represented by Formula III.

The preparation of sodium tetraborate inhibitors by the methods of the disclosures cited above required the duplication of a set of empirical conditions. The inflexibility of the process and lack of criteria upon which to base alterations was particularly disadvantageous when preparing the inhibitors on a large scale, as in manufacturing.

With changes in the scale of preparation, such factors as temperature, time of heating or reaction, surface to volume ratio of the solution, air pressure, and even humidity of the atmosphere were shown interrelated to some extent. Moreover, the amount of water introduced by reagents of differing water content was of importance in attempting to vary the procedure. The ultimate significance of these factors with respect to the composition of the inhibitors was minimized by the prolonged heating period in the methods cited above, during the latter part of which period the water content of the solution remained small and with only a small rate of change. With a longer heating period, however, objectionable solids began to form.

Accordingly, it is desirable to shorten the three hour heating period, as well as to eliminate the danger of overstepping it, in order to expedite manufacturing processes.

Although it was recognized that a water loss accompanied the formation of the sodium tetraborate-diol condensates, it was not previously possible by prior art methods applied to such compositions, to use this water loss as a criterion in the preparation of the condensates. Direct methods of water determination have heretofore been considered inapplicable because of the nature of the reacting medium. Difference methods, whereby the water remaining in the solution was estimated by measuring the evaporated water, were not entirely suitable for use even with laboratory equipment: varying amounts of water were introduced by the ingredients according to their grade and previous storage conditions. Varying amounts of water were also formed by the reaction of the ingredients, depending upon the final products, which were unknown. Also the evaporated water was accompanied by large amounts of glycol, thus making difficult the exact measurement of the water itself.

However, a water loss in itself did not invariably lead to the formation of the condensates, e.g., when water was removed from a 1,2-propylene glycol-sodium tetraborate solution under a vacuum.

This invention accordingly has as an object the development of a method for producing soluble sodium tetraborate-diol inhibitors which will result in flexibility in adapting the method to manufacturing conditions.

A further object is to decrease the time required for the final heating period without decreasing the reliability of the method for producing effective inhibitors.

A still further object of the invention is to develop objective criteria for determining the cut-off point for the reaction as well as to observe critical transitions during the course of the reaction.

A method which accomplishes the above objects and achieves other advantages which will become apparent to those skilled in the art has been made possible by the discovery that there is little reaction between the Karl Fischer reagent and the sodium tetraborate-diol condensation products of this invention. This discovery was surprising inasmuch as Karl Fischer as well as subsequent authorities have reported that it was not possible to use this reagent in the presence of borates. (Fischer, K., Agnew. Chem. 48, 394–6 (1935).)

The Karl Fischer reagent consists of $I_2$ and $SO_2$ as active ingredients dissolved in pyridine with methanol, or alternatively ethylene glycol mono methyl ether, as a further constituent. Although this reagent is nearly specific for water in organic compounds, a number of inorganic compounds interfere and both sodium and boron oxides behave as though the oxygen of these compounds were present as water: sodium tetraborate behaves as a mixture of sodium oxide and boron trioxide. Thus simplified equations, disregarding pyridine, are written as follows:

(1) $H_2O + I_2 + SO_2 + CH_3OH \rightarrow 2HI + HSO_4CH_3$, and
(2) $Na_2B_4O_7 + 7I_2 + 7SO_2 + 19CH_3OH$
$\rightarrow 2NaI + 12HI + 7HSO_4CH_3 + 4B(OCH_3)_3$ See Mitchell, J. et al., JACS 63, 2927–30 (1941). See also Mitchell, J. and Smith, D. M., Aquametry, 1948, Interscience Publishers Inc., at page 258.

The general stoichiometric concepts presented by Mitchell et al. do not hold if sodium tetraborate is condensed with a diol. Any Karl Fischer reagent which reacts, therefore, reacts with water present in the condensates. This water may be of hydration of the sodium tetraborate or water of reaction formed during condensation.

The finding of Mitchell and Smith (see Aquametry) that the iodine of the Karl Fischer reagent does not react with unsaturated bonds generally and that water present in 2-butyne-1,4-diol may be measured, has been confirmed with respect to this diol itself and its condensates with sodium tetraborate.

The objectives of this invention have been achieved by the further discovery that when water measurements were made on the sodium tetraborate-diol solutions, at intervals, when subjected to the methods of the previous disclosures, critical phenomena were indicated and the progress of the formation of desirable inhibitors could be followed thereby. It was still further discovered that a cut-off point for the reaction, whereby desirable inhibitors were formed with reproduceability, could be given in terms of the results of such measurements instead of time of heating.

A detailed description of the method of measurement used as well as its application to the manufacture of inhibitors is given below.

A standard commercial, single reagent, stabilized Karl Fischer reagent having an equivalent of at least 5.0 milligrams of water per milliliter of reagent can be conveniently used in the test procedure. Alternatively, the Karl Fischer reagent may be prepared using reagents and a method as follows:

| Chemical: | Quantity per liter |
|---|---|
| Pyridine (C.P.) _____ml__ | 269 |
| Iodine (U.S.P. resublimed) _____gms__ | 84.7 |
| Methanol (C.P.) _____ml__ | 667 |
| Sulfur dioxide (99.5%) _____ml__ | [1] 45 |

[1] 64 gms.

The iodine is dissolved in the pyridine and the methanol added. The solution is cooled in an ice bath and then $SO_2$, previously collected in a cold trap, is added slowly and with shaking. The solution is allowed to stand for two days before using. The excess of $SO_2$ is added for its stabilizing effect.

The tests were conducted according to the following procedure: A 0.1 gram sample is placed in a 125 ml. Erlenmeyer flask. 5.0 ml. of Karl Fischer reagent is added. The sample is stirred and immediately titrated at room temperature with standard water in methanol (1 ml.=1 mg. water) until the end point, characterized by the disappearance of the brown iodine color, is reached. A blank titration is similarly performed by titrating a 5.0 ml. portion of the Karl Fischer reagent with the standard water in methanol. The number of milliliters of standard water in methanol required to titrate the sample is subtracted from the number of milliliters of standard water in methanol required to titrate the blank. This value is equal to the number of milligrams of water in the sample. The percent of water or "water equivalent" is calculated by dividing the milligrams of water by the weight of the sample in milligrams and multiplying by 100.

A direct titration of the sample with the Karl Fischer reagent to a brown iodine end point is possible. In most cases, however, the end point obtained by the "back titration" procedure described above is much sharper and more reproducible.

The examples below illustrate the method for following the progress of a 1,2-propylene glycol-sodium tetraborate decahydrate condensation reaction, compare data at several critical condensation points for several sodium tetraborate-diol combinations, and illustrate the preparation of inhibitors using the newly developed criteria.

EXAMPLE I 40 grams of chemically pure sodium tetraborate decahydrate were added slowly, and with stirring until all solids were dissolved, to 200 grams of chemically pure 1,2-propylene glycol at 25° C. in an open 600 ml. beaker. This solution was heated at 85° C. for one hour and then at 105° C. for three additional hours. Water equivalent determinations by the "back titration" method described above were made at 25° C. and at 20 minute intervals during the heating period. The relationship between water equivalents and time of heating is shown graphically in the accompanying drawing, FIGURE 1. Numerical values for these equivalents are given in the following table:

*Table I*

[Water equivalents versus time of heating for one part 1,2-propylene glycol and 0.2 part sodium tetraborate decahydrate]

|  | At 25 C. | At 85 C. | | | At 105 C. | | | | | | | | |
|---|---|---|---|---|---|---|---|---|---|---|---|---|---|
| Minutes | (0) | 20 | 40 | 60(0) | 20 | 40 | 60 | 80 | 100 | 120 | 140 | 160 | 180 |
| Water, percent | 13.2 | 10.0 | 8.2 | 8.0 | 6.3 | 4.9 | 3.7 | 2.8 | 1.9 | 1.2 | 0.7 | 0.5 | 0.4 |

Upon continued heating, solids began to separate out from the solution.

EXAMPLE II

Three sodium tetraborate-diol solutions were prepared from chemically pure reagents according to the procedure given in Example I. These solutions were made by using ingredients as follows: (1) 40 grams sodium tetraborate decahydrate and 200 grams 1,2-propylene glycol; (2) 40 grams sodium tetraborate pentahydrate and 200 grams of 1,2-propylene glycol; and (3) 40 grams sodium tetraborate decahydrate and 200 grams ethylene glycol. As in Example I, the solutions were heated at 85° C. for one hour and then for three hours at 105° C. Water equivalents were obtained by the "back titration" method initially, at 25° C., and at the end of the heating at each temperature. These measured values are compared with the computed, expected, values in Table II, below.

*Table II*

[Water equivalents of condensates of one part diol and 0.2 part of sodium tetraborate hydrate]

| Condensate | Calculated water equivalents | | Measured water equivalents | | |
|---|---|---|---|---|---|
|  | Water of hydration | Apparent water expected from $Na_2B_4O_7$ | Before heating | After 1 hour at 85° C. | After 3 hours at 105° C. |
| Decahydrate/1,2-propylene glycol | 7.9 | 5.5 | 13.2 | 8.0 | 0.4 |
| Pentahydrate/1,2-propylene glycol | 5.2 | 7.2 | 12.1 | 5.6 | 0.4 |
| Decahydrate/ethylene glycol | 7.9 | 5.5 | 13.3 | 10.2 | 1.9 |

Upon continued heating, solids began to separate out from each of the three solutions.

EXAMPLE III 500 grams of 1,2-propylene glycol were placed in an open container and heated to 85° C. 150 grams of powdered sodium tetraborate decahydrate were added in three 50 gram increments, with stirring until the mixture became clear before the addition of another increment. After the third portion of the sodium tetraborate decahydrate had been added, the temperature was raised to 105° C. At 20 minute intervals 0.1 gram samples were removed from the reaction container and Karl Fischer water determinations made on them by the "back titration" procedure described above. Heating was discontinued when the samples showed less than a 2.5% water content.

The resultant liquid, which was the single condensate of 1,2-propylene glycol-sodium tetraborate, was clear, colorless, and viscous.

EXAMPLE IV 500 grams of 1,2-propylene glycol was placed in an open beaker and heated and stirred until a temperature of 85° C. was attained. This temperature was maintained and stirring continued while a quantity of 150 grams of sodium tetraborate decahydrate was added in 50 gram increments. Heating at 85° C. and stirring was continued after each of the first two additions until the mixture became clear. After the third portion of the sodium tetraborate had been added, the temperature was raised to 105° C. and stirring continued until a water determination by the Karl Fischer "back titration" procedure showed less than 7% water equivalent. 100 grams of 2-butyne-1,4-diol were then added slowly and with stirring. The temperature was maintained at 105° C. with stirring, and at 20 minute intervals 0.1 gram samples were removed from the reaction container and Karl Fischer water determinations made on these samples. Heating was discontinued when the samples showed less than 3.5% water content.

The resulting liquid which, was the double condensate of sodium tetraborate with 1,2-propylene glycol and 2-butyne-1,4-diol, was clear, amber and viscous.

Example I bears out previous observations in that it indicates that little or no condensation takes place at room temperature. Further experimentation also bears out previous observations in giving suitable temperatures for this reaction as 75° to 95° with 85° C. as the preferred temperature for the initial condensation step.

Further condensation is accompanied by the formation of water and consequently further reaction is promoted by a water loss. Preferred temperatures for this process are between 105° and 110° C. At appreciably higher temperatures there is an excessive loss of glycol as well as the formation of volatile borate esters. Lower temperatures and appreciably shorter periods of heating have been found to be unsuitable. The process is accordingly not amenable to the vacuum removal of water and pressures below about 600 milliliters of mercury are not recommended.

Although critical data were obtained only for condensates of sodium tetraborate with 1,2-propylene glycol, 2-btuyne-1,4-diol and ethylene glycol, the present invention offers a means for the investigation of the degree of condensation of other sodium tetraborate-diol condensates which should be of value in the preparation and investigation of such compositions.

Having thus described the invention, what is claimed as new and desired to be secured by Letters Patent is:

1. A method for preparing a corrosion inhibiting additive composition which comprises adding to one part by weight of 1,2-propylene glycol an amount of water corresponding to $(10-n)$ times the molar equivalent of sodium tetraborate to be added later, where $n$ represents the molar ratio of water of hydration associated with the said sodium tetraborate and is a number less than 10 which may be zero, heating to 85° C., and then adding the said sodium tetraborate in a state of hydration corresponding to the formula $Na_2B_4O_7 \cdot nH_2O$ in a total amount of .01 to .37 part by weight based on the weight of the 1,2-propylene glycol used, times the ratio of the molecular weight of $Na_2B_4O_7 \cdot nH_2O$ to $Na_2B_4O_7 \cdot 10H_2O$, and in increments of .01 to .10 part by weight, maintaining the temperature at approximately 85° C. and stirring until the mixture becomes clear before the addition of each increment, and after the addition of the final increment heating to 105° C. and maintaining the solution at this temperature until the said solution has a water content no greater than 2.5% as determined by the Karl Fischer method.

2. A method for preparing a corrosion inhibiting additive composition which comprises heating one part by weight of 1,2-propylene glycol to 85° C. and adding powdered sodium tetraborate decahydrate in a total amount of .30 part by weight of the 1,2-propylene glycol and in three equal increments, maintaining the temperature at 85° C. and stirring until the mixture becomes clear before the addition of each increment, and after the addition of the final increment heating to 105° C. and maintaining the solution at this temperature until the said solution has a water content no greater than 2.5% as determined by the Karl Fischer method.

3. A method for preparing a corrosion inhibiting additive composition which comprises adding to one part by weight of 1,2-propylene glycol an amount of water corresponding to $(10-n)$ times the molar equivalent of sodium tetraborate to be added later, where $n$ represents the molar ratio of water of hydration associated with the said sodium tetraborate and is a number less than 10 and which may be zero, heating to 85° C., and then adding the said sodium tetraborate in a state of hydration corresponding to the formula $Na_2B_4O_7 \cdot nH_2O$ in a total amount of .01 to .37 part by weight based on the weight of the 1,2-propylene glycol used, times the ratio of the molecular weight of $Na_2B_4O_7 \cdot nH_2O$ to $Na_2B_4O_7 \cdot 10H_2O$, and in increments of .01 to .10 part by weight, maintaining the temperature at approximately 85° C. and stirring until the mixture becomes clear before the addition of each increment, and after the addition of the final increment heating to 105° C. and maintaining this temperature until the solution has a water content no greater than 7% as determined by the Karl Fischer method and then adding 2-butyne-1,4-diol with stirring and in an amount equal to .01 to .25 part by weight of the said 1,2-propylene glycol and maintaining a temperature of 105° C. until the resulting solution has a water content no greater than 3.5% as determined by the Karl Fischer method.

4. A method for preparing a corrosion inhibiting additive composition which comprises heating one part by weight of 1,2-propylene glycol to 85° C. and adding powdered sodium tetraborate decahydrate in a total amount of .30 part by weight of the 1,2-propylene glycol and in three equal increments, maintaining the temperature at 85° C. and stirring until the mixture becomes clear before the addition of each increment, and after the addition of the final increment heating to 105° C. and maintaining this temperature until the solution has a water content no greater than 7% as determined by the Karl Fischer method and then adding .15 part by weight of 2-butyne-1,4-diol with stirring and maintaining a temperature of 105° C until the resulting solution has a water content no greater than 3.5% as determined by the Karl Fischer method.

No references cited.

CHARLES B. PARKER, *Primary Examiner.*

DELBERT R. PHILLIPS, *Assistant Examiner.*